(12) United States Patent
Inoue et al.

(10) Patent No.: US 11,402,427 B2
(45) Date of Patent: Aug. 2, 2022

(54) INFORMATION PROCESSING SYSTEM AND INFORMATION PROCESSING METHOD

(71) Applicant: Kabushiki Kaisha Toshiba, Minato-ku (JP)

(72) Inventors: Michinobu Inoue, Yokohama (JP); Hideo Nishiuchi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 444 days.

(21) Appl. No.: 16/013,377

(22) Filed: Jun. 20, 2018

(65) Prior Publication Data

US 2019/0079127 A1 Mar. 14, 2019

(30) Foreign Application Priority Data

Sep. 14, 2017 (JP) .............................. JP2017-176705

(51) Int. Cl.
G06Q 30/00 (2012.01)
G01R 31/28 (2006.01)
(Continued)

(52) U.S. Cl.
CPC ....... *G01R 31/2846* (2013.01); *G01R 31/281* (2013.01); *G06F 17/15* (2013.01);
(Continued)

(58) Field of Classification Search
CPC .. G06Q 10/06; G06Q 10/063; G06Q 10/0635; G06Q 50/04; G06Q 10/06398;
(Continued)

(56) References Cited

U.S. PATENT DOCUMENTS

| 7,451,065 B2 * | 11/2008 | Pednault ................ G06N 7/005 703/2 |
| 2006/0178918 A1 * | 8/2006 | Mikurak .......... G06Q 10/06375 705/7.25 |

(Continued)

FOREIGN PATENT DOCUMENTS

| CN | 1573785 A | 2/2005 |
| CN | 104166800 A | 11/2014 |

(Continued)

OTHER PUBLICATIONS

Bozarth, Cecil & Warsing, Donald & Flynn, Barbara & Flynn, E.. (2009). The Impactof Supply Chain Complexity on Manufacturing Plant Performance. Journal of Operations Management. 27. 78-93. 10.1016/j.jom.2008.07.003. (Year: 2009).*

*Primary Examiner* — Eric W Stamber
*Assistant Examiner* — Jay-Ming Wang
(74) *Attorney, Agent, or Firm* — Oblon, McClelland, Maier & Neustadt, L.L.P.

(57) ABSTRACT

According to one embodiment, an information processing system includes a memory, an inputter, and a processor. The memory stores correlation information including a specification item group, an element item group, and a risk item group. The specification item group includes specification items. The element item group includes element items. The risk item group includes risk items. One of the specification items to be modified is selected by a first operation input to the inputter. One of the element items is selected by a second operation input to the inputter. When the first operation is input, the processor refers to the correlation information and extracts at least one of the element items having a correlation with the one of the specification items. The processor extracts at least one of the risk items having a correlation (Continued)

with one element item of the at least one of the element items selected.

6 Claims, 8 Drawing Sheets

(51) Int. Cl.
    *G06F 17/15*     (2006.01)
    *G06Q 50/04*     (2012.01)
    *G06Q 10/06*     (2012.01)
    *G06F 30/20*     (2020.01)
    *G06F 111/20*     (2020.01)

(52) U.S. Cl.
    CPC .............. *G06F 30/20* (2020.01); *G06Q 10/06* (2013.01); *G06Q 10/063* (2013.01); *G06Q 10/0635* (2013.01); *G06Q 50/04* (2013.01); *G01R 31/2812* (2013.01); *G06F 2111/20* (2020.01)

(58) Field of Classification Search
    CPC ........ G06Q 10/00; G06Q 10/02; G06Q 10/10; G06Q 30/02; G01R 31/50; G01R 31/281; G01R 31/2846; G01R 31/2812; G06F 30/20; G06F 17/15; G06F 2111/20
    See application file for complete search history.

(56) References Cited

U.S. PATENT DOCUMENTS

| | | | |
|---|---|---|---|
| 2006/0190310 A1* | 8/2006 | Gudla | G06Q 10/063 705/7.11 |
| 2009/0083333 A1 | 3/2009 | Yamamoto et al. | |
| 2009/0157453 A1 | 6/2009 | Araki et al. | |
| 2009/0254572 A1* | 10/2009 | Redlich | G06Q 10/06 |
| 2009/0292384 A1* | 11/2009 | Hanawa | G06Q 10/0633 700/104 |
| 2010/0287105 A1 | 11/2010 | Araki et al. | |
| 2011/0251868 A1* | 10/2011 | Mikurak | G06Q 10/06315 705/7.25 |
| 2014/0103654 A1* | 4/2014 | Kosaka | F03D 7/028 290/44 |
| 2014/0188295 A1* | 7/2014 | Saito | G06Q 50/06 700/291 |
| 2014/0324521 A1* | 10/2014 | Mun | G06Q 10/04 705/7.28 |
| 2015/0220457 A1* | 8/2015 | Katoh | G06F 21/31 713/193 |
| 2015/0381649 A1* | 12/2015 | Schultz | H04L 63/1433 726/25 |
| 2016/0033961 A1* | 2/2016 | Kuninobu | G05B 19/41865 700/109 |
| 2017/0147722 A1* | 5/2017 | Greenwood | G16B 5/20 |
| 2017/0168472 A1* | 6/2017 | Ando | G06F 9/44521 |
| 2017/0235848 A1* | 8/2017 | Van Dusen | G06F 30/20 705/12 |
| 2017/0236065 A1* | 8/2017 | Kirschnick | G06Q 10/06 702/181 |
| 2017/0372704 A1* | 12/2017 | Papadimitriou | G01M 5/0033 |

FOREIGN PATENT DOCUMENTS

| | | |
|---|---|---|
| JP | 2007-109073 | 4/2007 |
| JP | 2009-75993 | 4/2009 |
| JP | WO2009/093440 | 7/2009 |
| JP | 2012-99074 | 5/2012 |
| JP | 2015-118593 | 6/2015 |
| KR | 10-2008-0039524 A | 5/2008 |

\* cited by examiner

MECHANISM INFORMATION

| SPECIFICATION | MANUFACTURING ELEMENT | RISK | MECHANISM |
|---|---|---|---|
| HEAT DISSIPATION | | TEMPERATURE INCREASE | PRODUCT TEMPERATURE INCREASES DUE TO HEAT DISSIPATION DECREASE |
| HEAT DISSIPATION | | POSITIONAL SHIFT | THERMAL CONDUCTIVITY DEGRADES AND HEAT DISSIPATION DECREASES DUE TO POSITIONAL SHIFT BETWEEN COMPONENT PARTS |
| ELECTRICAL CHARACTERISTIC | | RESISTANCE INCREASE | ELECTRICAL RESISTANCE INCREASES DUE TO DEGRADATION OF ELECTRICAL CHARACTERISTICS |
| • | | • | • |
| • | | • | |
| | SOLDER | TEMPERATURE INCREASE | SOLDER MATERIAL AND VOIDS IN SOLDERING AFFECT TEMPERATURE INCREASE |
| | SOLDER | SOLDER CRACK | SOLDER MATERIAL AND VOIDS IN SOLDERING AFFECT SOLDER CRACKS |
| | ELECTRONIC PART | RESISTANCE INCREASE | THERE IS A POSSIBILITY THAT ELECTRICAL RESISTANCE OF PRODUCT MAY INCREASE IF CHARACTERISTIC OF ELECTRONIC PART IS MODIFIED |
| | • | | • |
| | • | | |

EXAMPLE INFORMATION

| SPECIFICATION | MANUFACTURING ELEMENT | RISK | EXAMPLE |
|---|---|---|---|
| ELECTRICAL CHARACTERISTIC | | POSITIONAL SHIFT | ELECTRICAL RESISTANCE INCREASED FROM X TO Y WHEN AVERAGE VALUE OF POSITIONAL SHIFT INCREASED FROM A TO B |
| • | | • | • |
| • | | • | |
| | SUBSTRATE | SOLDER CRACK | SOLDER CRACKS OCCUR MORE EASILY WHEN CERAMIC SUBSTRATE MATERIAL IS MODIFIED FROM C TO D |
| | SOLDERING | NON-BONDING | NON-BONDING OCCURS MORE EASILY WHEN SOLDERING IF AMOUNT OF SOLDER IS SET TO E AND PART IS PRESSED ONTO SOLDER WITH LOAD OF F |
| | • | | • |
| | • | | |

FIG. 5

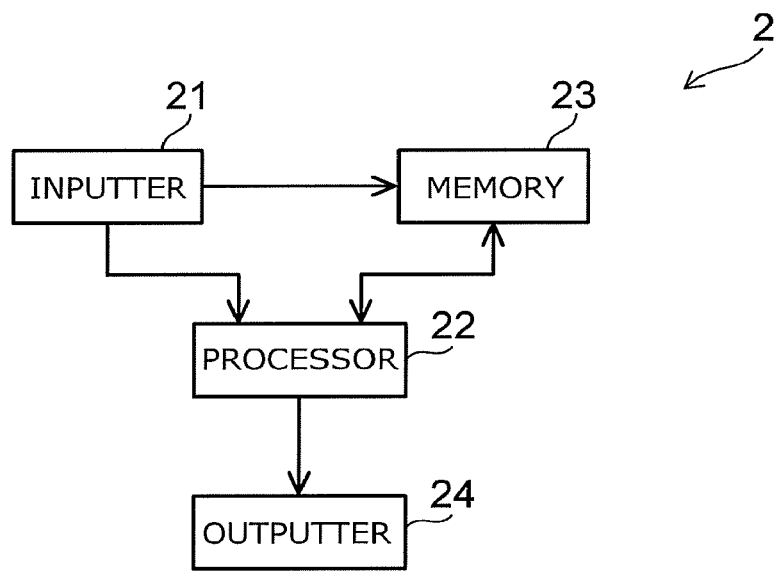

FIG. 6

| EVALUATION METHOD (FIRST EVALUATION ITEM) | FIRST CHARACTERISTIC VALUE |
|---|---|
| PROTOTYPE TEST | 1.0 |
| SIMULATION | 0.7 |
| PAST KNOWLEDGE | 0.5 |

| EVALUATION RESULT (SECOND EVALUATION ITEM) | SECOND CHARACTERISTIC VALUE |
|---|---|
| SPECIFICATION SATISFIED WITH MARGIN | 1.0 |
| SPECIFICATION SATISFIED | 0.7 |
| NOT PERFORMED, OR SPECIFICATION NOT SATISFIED | 0.1 |

| EVALUATION OBJECT (THIRD EVALUATION ITEM) | THIRD CHARACTERISTIC VALUE |
|---|---|
| PROTOTYPE OF NEW PRODUCT | 1.0 |
| DIFFERENT MATERIAL OR FORM | 0.5 |
| DIFFERENT MATERIAL AND FORM | 0.3 |

FIG. 7

INFORMATION PROCESSING SYSTEM AND INFORMATION PROCESSING METHOD

CROSS-REFERENCE TO RELATED APPLICATIONS

This application is based upon and claims the benefit of priority from Japanese Patent Application No. 2017-176705, filed on Sep. 14, 2017; the entire contents of which are incorporated herein by reference.

FIELD

Embodiments described herein relate generally to an information processing system and an information processing method.

BACKGROUND

In the manufacturing sector, the development of new products is performed continuously. For example, development is performed to cause the new product to satisfy a specification requested by the market and/or customers. Due to the higher performance and higher complexity of products in recent years, there are cases where a long interval is necessary to develop a product that satisfies the specification, a product that satisfies the specification ultimately cannot be developed, etc.

For example, the following cases occur in the development of a product. Development to modify some manufacturing element of the product is pursued to improve some performance of the product. However, it is discovered in the development that another specification cannot be satisfied. In such a case, it is necessary to redo the design and the development. In the redo, the manufacturing element to be modified is newly examined. Or, a new method for satisfying the other specification is examined.

Therefore, in the development of the new product, it is desirable to extract, at an earlier stage (further upstream in the development), the risks that may become apparent downstream in the development so that the redo of the design can be prevented. Thus, it is desirable to develop an information processing system and an information processing method in which such efficient design and development are possible.

BRIEF DESCRIPTION OF THE DRAWINGS

FIG. 5 is a table illustrating an example of the risk information;

FIG. 6 is a block diagram illustrating the configuration of an information processing system according to a second embodiment;

FIG. 7 is a table illustrating the evaluation items and the characteristic values;

DETAILED DESCRIPTION

According to one embodiment, an information processing system includes a memory, an inputter, and a processor. The memory stores correlation information. The correlation information includes a specification item group, an element item group, and a risk item group. The specification item group includes a plurality of specification items relating to a specification of a product. The element item group includes a plurality of element items relating to a manufacturing element of the product. The risk item group includes a correlation between the plurality of specification items and the plurality of element items. The risk item group includes a plurality of risk items relating to a risk of the product. A first operation and a second operation are input to the inputter. One of the specification items to be modified is selected by the first operation. One of the element items is selected by the second operation. When the first operation is input, the processor refers to the correlation information and extracts at least one of the element items having a correlation with the one of the specification items. The correlation is via the risk item group. The processor extracts at least one of the risk items having a correlation with one element item of the at least one of the element items selected by the second operation.

First Embodiment

Figure 1:
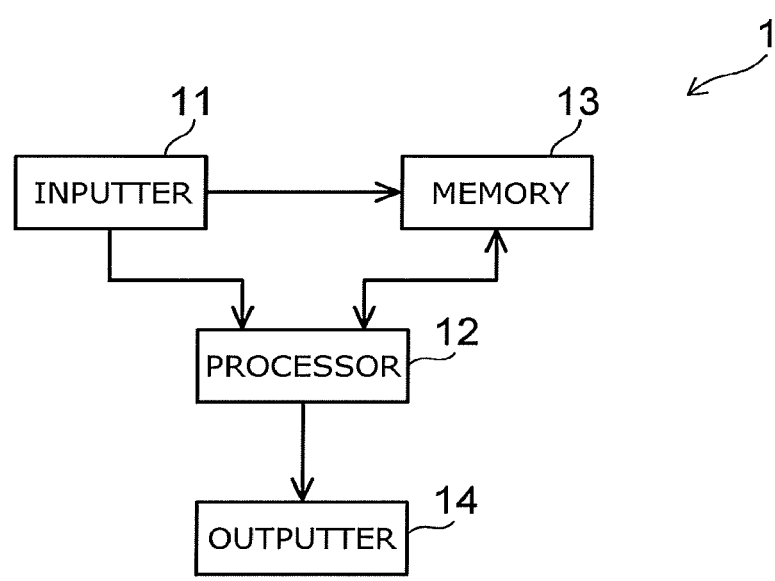
FIG. 1 is a block diagram illustrating the configuration of an information processing system according to a first embodiment.

FIG. 1 is a block diagram illustrating the configuration of an information processing system according to a first embodiment.

For example, the information processing system 1 according to the first embodiment is used when performing the design and the development of a new product having a different specification from the existing product. For example, the information processing system 1 is used in the case where some specification of the existing product is improved based on a request from a customer.

As illustrated in FIG. 1, the information processing system 1 according to the first embodiment includes an inputter 11, a processor 12, memory 13, and an outputter 14.

The inputter 11 receives an input operation to the information processing system 1. For example, the operation is performed by a user of the information processing system 1. The processor 12 performs various processing of the information processing system 1 according to the operation received by the inputter 11. In these processing, the processor 12 refers to the memory 13 as appropriate. The memory 13 stores information necessary for the processing of the information processing system 1. The outputter 14 outputs the result of the processing of the information processing system 1, etc., in a format that is recognizable by the user.

Figure 2:
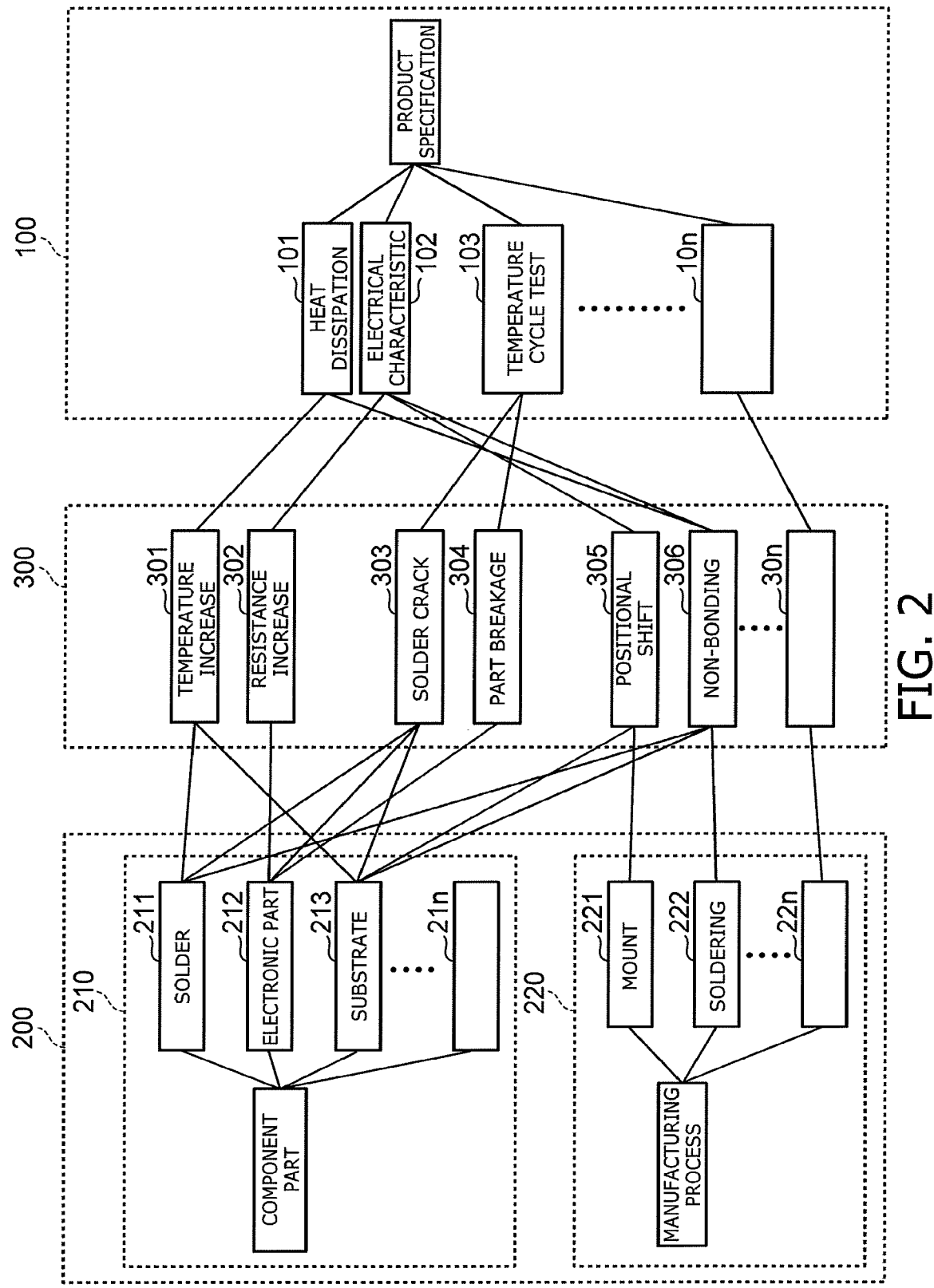
FIG. 2 is a schematic view illustrating correlation information stored in the memory.

FIG. 2 is a schematic view illustrating correlation information stored in the memory.

For example, the memory 13 stores the correlation information illustrated in FIG. 2. The correlation information includes a specification item group 100, an element item group 200, and a risk item group 300. For example, the correlation information is input beforehand to the information processing system 1 using the inputter 11 and is stored in the memory 13.

The specification item group 100 includes multiple specification items 101, 102, 103, . . . , 10n relating to the specification of the product. These specification items relate to the performance and/or the reliability of the product. For example, the multiple specification items include the specification item 101 that relates to the heat dissipation, the specification item 102 that relates to an electrical characteristic, the specification item 103 that relates to a temperature cycle test, etc.

The element item group 200 includes the multiple element items relating to the manufacturing element of the product. As an example, the multiple element items include multiple component part items 211, 212, 213, . . . , 21n that relate to a component part used to manufacture the product, and multiple manufacturing process items 221, 222, . . . , 22n that relate to the manufacturing processes of the product. The multiple component part items include, for example, the component part items 211 to 213. The component part items 211 to 213 respectively represent solder, an electronic part, and a substrate as the component parts. The multiple manufacturing process items include, for example, the manufacturing process items 221 and 222. The manufacturing process items 221 and 222 respectively represent mount (mounting) and soldering as the manufacturing processes of the product.

The specification item group 100 and the element item group 200 are associated (have a correlation) via the risk item group 300. In FIG. 2, the lines that connect the specification items and the risk items and the lines that connect the element items and the risk items each represent a correlation. The risk item group 300 includes multiple risk items 301, 302, . . . , 30n relating to the risk of the product. These risk items relate to the risk that may occur in the case where the performance of the product does not satisfy the specification, the risk that may occur in the market after the shipment of the product, the risk relating to manufacturing defects, etc.

For example, the multiple risk items include the following risk items 301 to 306. The risk item 301 relates to a temperature increase that may occur in the case where the heat dissipation of the product does not satisfy the specification. The risk item 302 relates to the electrical resistance increase accompanying the temperature increase. The risk items 303 and 304 respectively relate to cracks of the solder and breaking of the electronic part that may occur after the shipment. The risk items 305 and 306 respectively relate to positional shift of the mount and non-bonding of the solder that may occur in the manufacturing processes.

Figure 3:
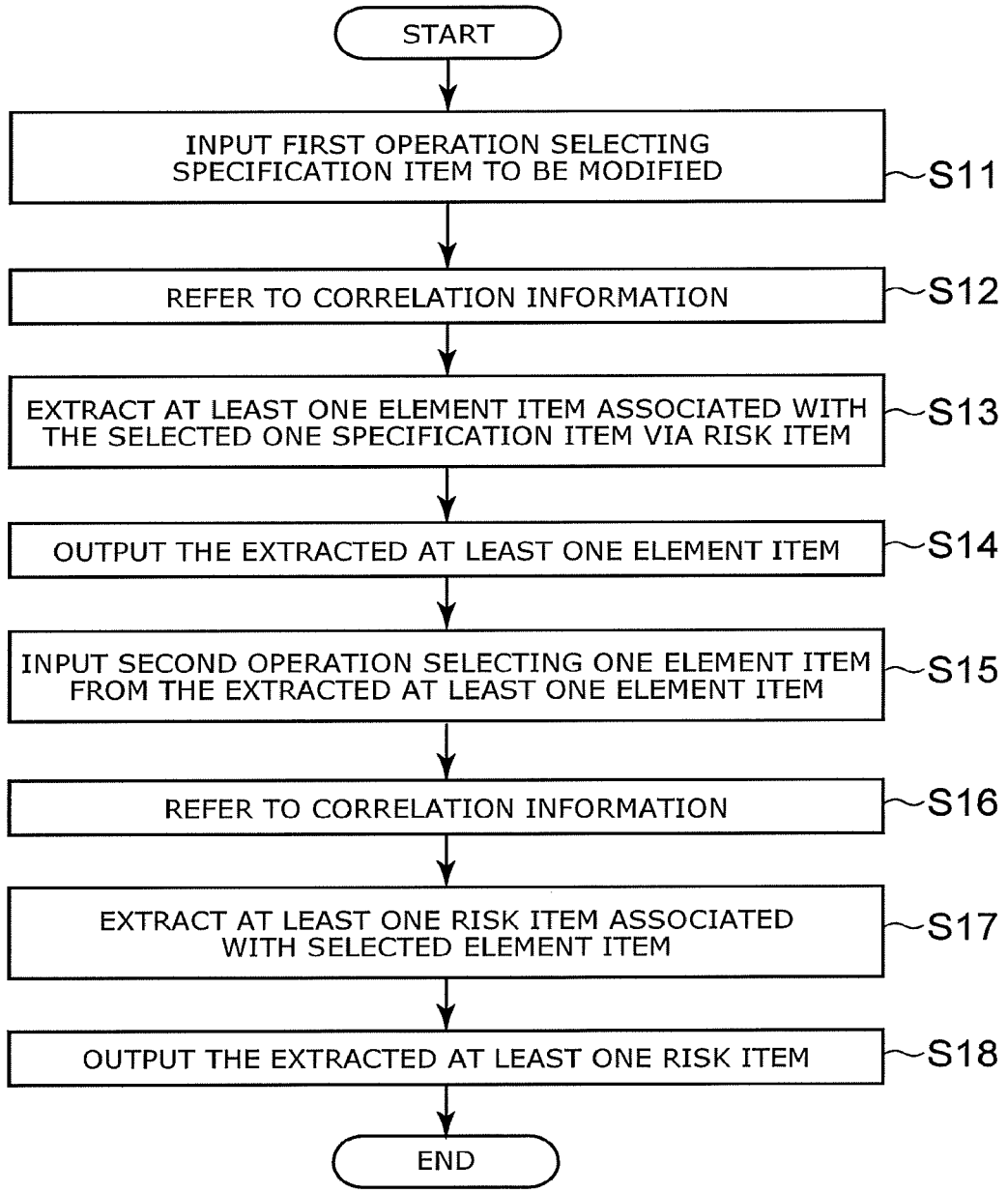
FIG. 3 is a flowchart illustrating the operation of the information processing system according to the first embodiment.

FIG. 3 is a flowchart illustrating the operation of the information processing system according to the first embodiment.

The flowchart illustrated in FIG. 3 corresponds to the information processing method according to the first embodiment.

Here, the case where the information processing system 1 uses the correlation information illustrated in FIG. 2 is described as an example.

First, a first operation is input to the inputter 11 (step S11). In the first operation, one specification item that corresponds to the specification to be modified is selected. As an example, in the case where the design and the development are performed for a new product having better heat dissipation than the existing product, the specification item 101 of "heat dissipation" illustrated in FIG. 2 is selected in the first operation.

When the first operation is input, the processor 12 refers to the correlation information stored in the memory 13 (step S12). The processor 12 extracts at least one of the element items having a correlation via the risk items with the selected one specification item recited above (step S13). For example, the processor 12 extracts the component part items 211 and 213 and the manufacturing process item 222 that have correlations with the specification item 101 of "heat dissipation" via the risk items 301 and 306. The extraction processing is performed based on the referred correlation information. The processor 12 outputs the extracted at least one of the element items to the outputter 14 (step S14).

A second operation is input to the inputter 11 (step S15). In the second operation, one element item is selected from the extracted at least one of the element items. For example, in the case where the material of the solder or the like is modified to improve the heat dissipation, the element item 211 of "solder" is selected in the second operation.

When the second operation is input, the processor 12 refers to the correlation information stored in the memory 13 (step S16). The processor 12 extracts at least one of the risk items having a correlation with the selected one element item recited above (step S17). For example, the processor 12 extracts the risk items 301 to 304 and 306 of "temperature increase," "resistance increase," "solder crack," "part breakage," and "non-bonding" having correlations with the element item 211 of "solder." The extraction processing is performed based on the referred correlation information. The processor 12 outputs the extracted at least one of the risk items to the outputter 14 (step S18).

According to the information processing system and the information processing method recited above, when modifying the specification of the product, the manufacturing elements can be extracted for which the design modification can effectively satisfy the specification after the modification. Further, when specifically selecting the manufacturing element to be modified, the risk that may occur due to the modification of the manufacturing element is extracted. Therefore, the risk that may occur when modifying the manufacturing element can be confirmed at an earlier stage. As a result, the likelihood of the occurrence of the redo of the design and the development and/or situations causing a delay can be reduced. For example, the likelihood can be reduced for the occurrence of a situation in which a risk becomes apparent after pursuing the development of a new product for which the manufacturing element is modified. In other words, more efficient design and development are possible by using the information processing system 1 and the information processing method according to the first embodiment.

In the example illustrated in FIG. 2, the element item group 200 includes both a component part item group 210 that includes the multiple component part items 211 to 21n and a manufacturing process item group 220 that includes the multiple manufacturing process items 221 to 22n. The element item group 200 may include only one of these two. More desirably, the element item group 200 includes both the component part item group 210 and the manufacturing process item group 220. In other words, it is desirable for the multiple component part items 211 to 21n and the multiple manufacturing process items 221 to 22n to be associated with the multiple risk items. This is because the risk of the new product can be extracted from the perspective of both the component part and the manufacturing process. Thereby, the likelihood of the occurrence of the redo of the design and the development and/or situations causing a delay can be reduced further; and more efficient design and development are possible.

The specification item group 100 and the element item group 200 each have independent tree structures. The multiple specification items 101 to 10*n* are positioned at the terminals (the leaves) of the tree structure of the specification item group 100. The component part items 211 to 21*n* and the manufacturing process items 221 to 22*n* are positioned at the terminals of the tree structure of the element item group 200. Because the specification item group 100 and the element item group 200 each have tree structures, the characteristics and/or the classifications of each of the specification items and each of the element items are easily understood. When generating the correlation information, it is easy to prevent missing items.

Further, it is desirable for the component part item group 210 and the manufacturing process item group 220 included in the element item group 200 to have independent tree structures. According to such a configuration, it is easily understood whether the element items included in the element item group 200 relate to the component parts or whether the element items relate to the manufacturing processes. When generating the correlation information, it is easy to prevent missing items by generating the items from the perspectives of both the component part and the manufacturing process.

Modification

Figure 4:
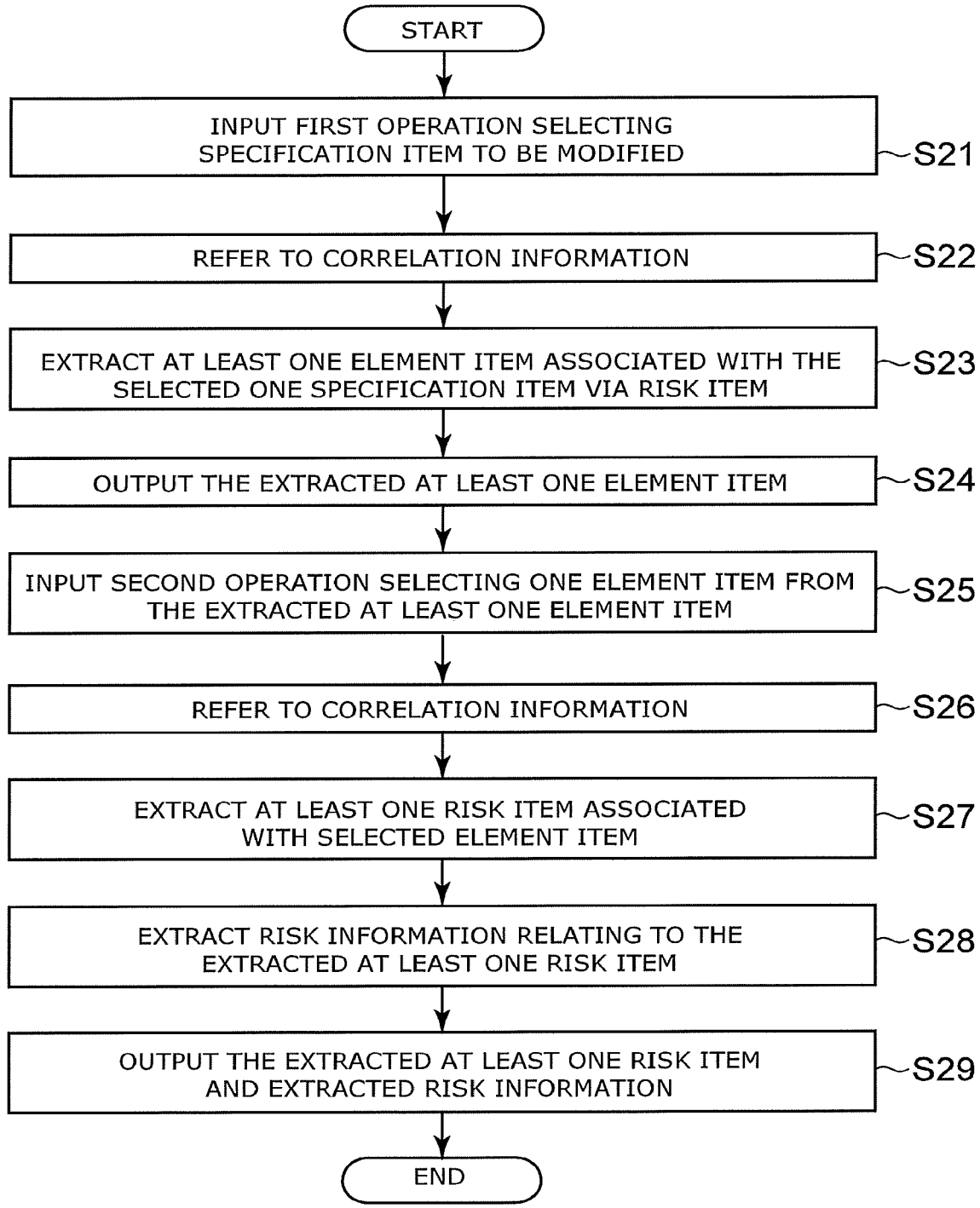
FIG. 4 is a flowchart illustrating another operation of the information processing system according to the first embodiment.

FIG. 4 is a flowchart illustrating another operation of the information processing system according to the first embodiment.

FIG. 5 is a table illustrating an example of the risk information.

The memory 13 may further store risk information. The risk information includes at least one of mechanism information or example information. The mechanism information includes mechanisms of the correlation between the risk of the product and the specification of the product or between the risk of the product and the manufacturing element of the product. The example information includes examples in which the risk of the product occurred in relation to the specification of the product or the manufacturing element of the product.

FIG. 5 illustrates an example of the risk information. The mechanism information and the example information each are associated with a risk item and at least one of a specification item or an element item. For the mechanism and the example, a specific relationship between the risk item and the at least one of the specification item or the element item is stored in the risk information. For example, the human that performs the design or the development of the new product confirms at least one of the mechanism information or the example information. Thereby, the specific relationship between the risk item and the at least one of the specification item or the element item can be understood.

Steps S21 to S27 of the flowchart illustrated in FIG. 4 are performed similarly to steps S11 to S17 of the flowchart illustrated in FIG. 3. The processor 12 further refers to the memory 13 and extracts the risk information relating to the at least one of the risk items extracted in step S17 (step S28). The outputter 14 outputs the extracted at least one of the risk items and the extracted risk information (step S29).

According to the information processing system and the information processing method according to the modification, the user can confirm the reason that the extracted at least one of the risk items is associated with the selected element item. Accordingly, the user can support the efficient design and development even in the case where the user does not have knowledge relating to the extracted risk items, etc.

Second Embodiment

FIG. 6 is a block diagram illustrating the configuration of an information processing system according to a second embodiment.

The information processing system 2 according to the second embodiment can be used to estimate how much of a risk of the specification being unsatisfied exists for the new product after the manufacturing element is modified.

As illustrated in FIG. 6, the information processing system 2 according to the second embodiment includes an inputter 21, a processor 22, memory 23, and an outputter 24.

The inputter 21 receives an input operation to the information processing system 2. According to the operation of the inputter 21, the processor 22 performs various processing of the information processing system 2. The memory 23 stores the information necessary for the processing of the information processing system 2. The outputter 24 outputs the result of the processing of the information processing system 2, etc., to the user of the information processing system 2, etc.

The memory 23 stores a first formula representing the relationship between a predicted value and a characteristic value group including a first characteristic value and a second characteristic value. The first characteristic value represents the characteristic of a first evaluation item relating to the evaluation of the new product. The second characteristic value represents the characteristic of a second evaluation item relating to the evaluation of a first risk of the new product. The predicted value represents the likelihood of the occurrence of the first risk for the new product. For example, the first formula is input beforehand to the information processing system 2 using the inputter 21 and is stored in the memory 23.

For example, the first evaluation item is one selected from a first group consisting of an evaluation object, an evaluation method, and an evaluation quantity. For example, the second evaluation item is one selected from a second group consisting of an evaluation result, an evaluation interval, and an evaluation cost.

One specific example of the evaluation items and the characteristic values will now be described referring to FIG. 7.

FIG. 7 is a table illustrating the evaluation items and the characteristic values.

In the example, the characteristic value group further includes a third characteristic value in addition to the first characteristic value and the second characteristic value. The third characteristic value represents the characteristic of a third evaluation item relating to the evaluation of the new product. The third evaluation item is, for example, another one selected from the first group.

In the example illustrated in FIG. 7, the first evaluation item is the method (the evaluation method) for evaluating the new product. For example, one of 1.0, 0.7, or 0.5 is set as the first characteristic value representing the characteristic of the first evaluation item. These numerical values respectively indicate that the evaluation of the new product is based on a prototype test using the new product, an evaluation or an analysis using a simulation, or past knowledge.

The second evaluation item is the result (the evaluation result) of evaluating the first risk of the new product. For example, one of 1.0, 0.7, or 0.1 is set as the second characteristic value representing the characteristic of the second evaluation item. These numerical values respectively indicate that the evaluation result of the new product satisfies the specification and has a relatively large margin with respect to the specification, that the specification is satisfied with a relatively small margin, or that the specification is not satisfied or the evaluation is not performed. For example, the magnitude of the margin is determined by comparing the margin to a prescribed threshold.

The third evaluation item is the object (the evaluation object) used to evaluate the new product. For example, one of 1.0, 0.5, or 0.3 is set as the third characteristic value representing the characteristic of the third evaluation item. These numerical values respectively indicate that the product used in the evaluation of the new product is a prototype of the new product, a prototype having a material or form different from that of the new product, or a prototype having a material and a form that are different from those of the new product.

For example, the memory 23 stores the following Formula 1 as the first formula representing the relationship between the predicted value and the characteristic value group including the first to third characteristic values.

$$V = \ln \frac{1}{A_1 \times A_2 \times A_3} \quad \text{[Formula 1]}$$

In Formula 1, $A_1$ is the first characteristic value. $A_2$ is the second characteristic value. $A_3$ is the third characteristic value. V is the predicted value.

For example, a prototype of the new product is made; and a test is performed using the prototype. In the case where the prototype satisfies the specification after the modification, the first to third characteristic values respectively are 1.0, 1.0, and 0.7. In such a case, the processor 22 outputs a value of about 0.36 as the predicted value. According to Formula (1), the predicted value decreases as the risk decreases.

As described above, the evaluation quantity, the evaluation interval, the evaluation cost, etc., may be used as other evaluation items.

The evaluation quantity is the number (number of times) of the prototype or the simulation for which the evaluation is performed. The repeatability and reproducibility of the performance and the fluctuation of the performance can be evaluated more accurately as the evaluation quantity is increased. In the case where the evaluation is performed based on the analysis result of a simulation, it is desirable to perform the simulation using the fluctuation as a parameter. For example, the fluctuation of the dimensions, the characteristics, a combination of the dimensions and the characteristics, or the like is used. In the case where the evaluation quantity is used as the evaluation item, for example, a higher characteristic value is set as the evaluation quantity is increased.

The evaluation interval is the interval necessary for the evaluation of the new product using an experiment, a simulation, etc. The likelihood of an increase of the development time increases as the interval necessary for the evaluation lengthens. Therefore, the risk for the design and the development of the new product increases as the evaluation interval lengthens. Accordingly, in the case where the evaluation interval is used as the evaluation item, for example, a lower characteristic value is set as the evaluation interval lengthens.

The design and the development of the new product incur costs. For example, after the manufacturing element to be modified is determined for the new product, an estimation of the necessary cost is performed for the design and the development accompanying the manufacturing element to be modified. The risk of the design and the development of the new product increases as the cost increases. Accordingly, in the case where the evaluation cost is used as the evaluation item, for example, a lower characteristic value is set as the estimated cost increases.

The operation of the information processing system 2 according to the second embodiment will now be described.

Figure 8:
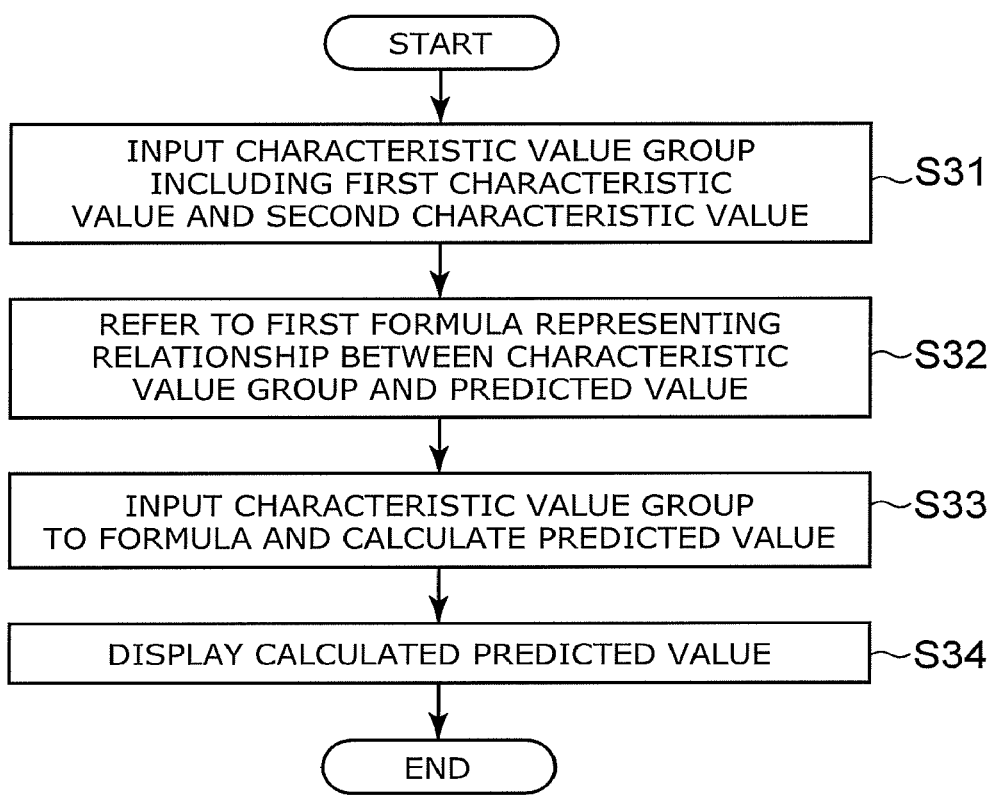
FIG. 8 is a flowchart illustrating the operation of the information processing system according to the second embodiment.

FIG. 8 is a flowchart illustrating the operation of the information processing system according to the second embodiment.

The flowchart corresponds to the information processing method according to the second embodiment.

First, the manufacturing element of the product to be modified is determined before using the information processing system 2 according to the second embodiment. Then, the evaluation of the new product after the manufacturing element is modified is performed. By the evaluation, the information that is necessary for setting the characteristic value group including the first characteristic value and the second characteristic value is obtained.

After performing the evaluation, the characteristic value group that includes the first characteristic value and the second characteristic value is input to the inputter 21 (step S31). When the characteristic value group is input, the processor 22 refers to the first formula that is stored in the memory 23 and represents the relationship between the predicted value and the characteristic value group (step S32). The processor 22 inputs the characteristic value group to the first formula and calculates the predicted value (step S33). The processor 22 displays the calculated predicted value to the outputter 24 (step S34).

Effects of the second embodiment will now be described.

According to the second embodiment, for a new product, the predicted value that represents the likelihood of the occurrence of the first risk for the new product can be obtained by inputting the characteristic value group. Accordingly, the likelihood of the occurrence of the first risk for the new product can be confirmed by confirming the predicted value. For example, in the case where the first risk is high, the likelihood is high that even if the development is pursued, the first risk may become apparent; and the new product may not be able to satisfy the specification relating to the first risk. Therefore, it may be considered to respond by performing a further design modification of the manufacturing element at an early stage. As a result, the occurrence of the redo of the design and/or the development, etc., can be suppressed; and efficient design and development are possible.

Here, the predicted value is used as the likelihood of the occurrence of the first risk. However, the perception of the predicted value is arbitrary. For example, the predicted value may be a value representing the smallness of the likelihood of the first risk becoming apparent for the new product, and whether it is safe. Even in such a case, the predicted value can be considered to be a value substantially representing the risk. The first formula may be generated so that the likelihood of the occurrence of the first risk decreases as the predicted value increases.

The number of characteristic values included in the characteristic value group is arbitrary. In Formula 1, the characteristic value group includes the three characteristic values of the first to third characteristic values. The number of characteristic values included in the characteristic value group may be less than three or may be four or more. It is desirable for the characteristic value group to include at least the two characteristic values of the first characteristic value and the second characteristic value described above so that the predicted value can predict the likelihood of the occurrence of the first risk with better accuracy.

For example, in the case where the first evaluation item is the evaluation object, it is desirable for the first characteristic value to be selected from the group including the first value and the second value. The first value indicates that the evaluation object is a prototype. The second value indicates that the evaluation object is a simulation. This is because the making of the prototype and the performing of the simulation are effective methods when evaluating the new product.

Modification

In the information processing system 1 according to the first embodiment, an operation similar to that of the information processing system 2 according to the second embodiment may be further performed. Namely, the inputter 11, the processor 12, the memory 13, and the outputter 14 may further function respectively as the inputter 21, the processor 22, the memory 23, and the outputter 24.

For example, the operation illustrated in the flowchart of FIG. 3 is performed using a first information processing system 1. Subsequently, the user of the information processing system 1 evaluates the selected manufacturing element for the modified new product. At this time, the evaluated first risk corresponds to one risk item selected from the at least one of the risk items extracted in step S17.

The characteristic value group that includes the first characteristic value and the second characteristic value is obtained as a result of the evaluation. The characteristic value group is input to the inputter 11. The processor 12 outputs the predicted value representing the likelihood of the occurrence of the first risk. The outputter 14 outputs the predicted value to the outside.

In the case where there are multiple risk items extracted in step S17, the predicted value representing the likelihood of the occurrence of the risk may be obtained for each risk item. For example, multiple risk items of a first risk item and a second risk item are extracted in step S17. In such a case, the user of the information processing system 1 obtains two predicted values using the first characteristic value group and the second characteristic value group. The first characteristic value group is obtained by evaluating the first risk corresponding to the first risk item. The second characteristic value group is obtained by evaluating the second risk corresponding to the second risk item. Thereby, the likelihood of the occurrence can be confirmed for the first risk and the second risk for the new product.

Figure 9:
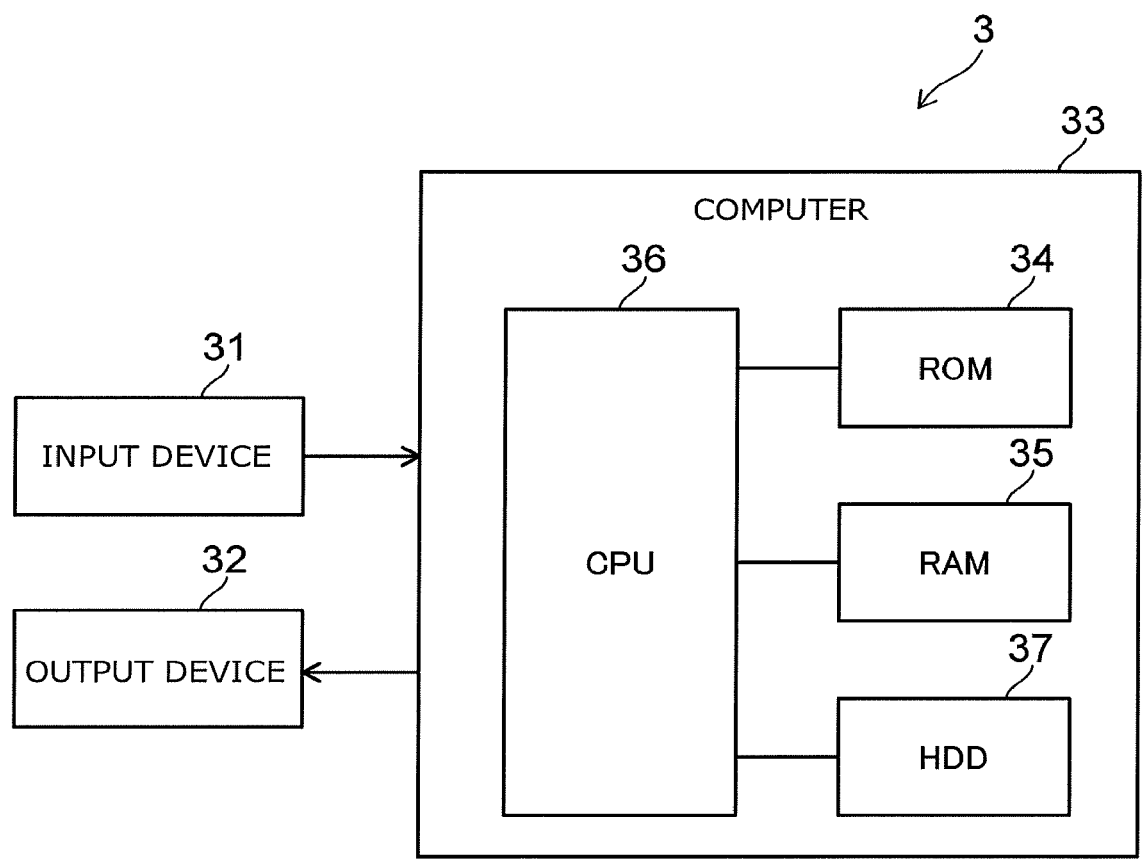
FIG. 9 is a block diagram illustrating the configuration of a support device for realizing the information processing system according to the embodiment.

FIG. 9 is a block diagram illustrating the configuration of a support device for realizing the information processing system according to the embodiment.

The support device 3 includes, for example, an input device 31, an output device 32, and a computer 33. The computer 33 includes, for example, ROM (Read Only Memory) 34, RAM (Random Access Memory) 35, a CPU (Central Processing Unit) 36, and a HDD (Hard Disk Drive) 37 as a memory device.

The input device 31 is for the user inputting information to the support device 3. The input device 31 is a keyboard, a touch panel, a microphone (a voice input), etc. The input device 31 functions as the inputter 11 or 22.

The output device 32 is for outputting, to the user, the output result obtained by the information processing system. The output device 32 is a display, a printer, a speaker, etc. The output device 32 functions as the outputter 14 or 24.

The ROM 34 stores a program controlling the operation of the support device 3. A program that is necessary for causing the computer 33 to function as the processor 12 or 22 illustrated in FIG. 1 and FIG. 6 is stored in the ROM 34.

The RAM 35 functions as a memory region where the program stored in the ROM 34 is implemented. The CPU 36 reads a control program stored in the ROM 34 and controls the operation of the computer 33 according to the control program. Also, the CPU 36 loads various data obtained by the operation of the computer 33 into the RAM 35. The HDD 37 stores information used by the computer 33. The HDD 37 functions as the memory 13 or 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A method to modify a current design of a product by determining risk associated with modifying a component part or a manufacturing process of the product to satisfy a new performance or reliability specification for the product, comprising:

storing, in a memory, a correlation data structure, the correlation data structure including a plurality of nodes arranged in at least three groups, including a specification item group, an element item group, and a risk item group, the specification item group including a plurality of specification items relating to a specification of the product, each of the specification items relating to a performance or a reliability of the product, the element item group including a plurality of element items relating to a manufacturing element of the product, each of the element items relating to a component part or a manufacturing process for the product, the risk item group including a plurality of risk items associated with the plurality of specification items and the plurality of element items, wherein the correlation data structure further includes connection information specifying connections between the plurality of nodes, the connection information including (1) first connection information indicating correlations between each of the plurality of specification items in the specification item group and at least one of the plurality of risk items in the risk item group, and (2) second connection information indicating correlations between each of the plurality of risk items in the risk item group and at least one of the plurality of element items in the element item group;

determining, by processing circuitry based on the connection data structure, at least one of the element items having a correlation with a selected particular specification item to be modified, the correlation being determined by traversing the nodes in the connection data structure in a first direction, via all possible paths, through the risk item group to the element item group using the first and second connection information;

selecting a particular element item of the element items from the determined at least one of the element items;

extracting, by the processing circuitry by traversing the nodes in the connection data structure in a second direction different from the first direction via all possible paths, using the second connection information, at least one particular risk item having a correlation with the particular element item;

extracting, from the memory by the processing circuitry, particular risk information explaining a reason for extracting the at least one particular risk item, the particular risk information including at least one of mechanism information and example information, which each describe a specific relationship between the at least one particular risk item and at least one of the particular specification item and the particular element item;

determining an evaluation value indicating a result of evaluating the at least one particular risk item with respect to the new performance or reliability specification, determining a margin value by comparing the evaluation value to a predetermined threshold, and determining a predicted risk value based on the margin value;

outputting, by the processing circuitry, (1) the at least one particular risk item, which indicates the risk associated with the performance or the reliability of the product, indicated by the selected specification item, when the component part or the manufacturing process, indicated by the selected element item, is modified, and (2) the extracted particular risk information associated with the at least one particular risk item; and modifying the current design of the product, when the predicted risk value indicates that the new performance or reliability specification for the product is not satisfied.

2. The method according to claim 1, wherein
the plurality of element items includes a plurality of component part items and a plurality of manufacturing process items,
the plurality of component part items relates to a component part used to manufacture the product, and
the plurality of manufacturing process items relates to a manufacturing process of the product.

3. The method according to claim 2, wherein
a component part item group and a manufacturing process item group each have tree structures, the tree structures being independent,
the component part item group includes the plurality of component part items, and
the manufacturing process item group includes the plurality of manufacturing process items.

4. The method according to claim 1, wherein
the specification item group and the element item group each have tree structures, the tree structures being independent.

5. The method according to claim 1, further comprising:
referring to risk information, the risk information including at least one of the mechanism information and the example information, the mechanism information including a mechanism of a correlation between the risk and the specification of the product or between the risk and the manufacturing element of the product, the example information including an example of the risk occurring in relation to the specification of the product or the manufacturing element of the product;
extracting the particular risk information relating to the extracted at least one particular risk item; and
outputting the extracted particular risk information.

6. The method of claim 1, further comprising traversing the correlation information in a first direction from the selected particular specification item to the at least one of the element items, and then traversing the correlation information in a second direction, opposite the first direction, from the particular element item to the at least one particular risk item.

* * * * *